Sept. 29, 1970 K. B. MAYNARD ET AL 3,531,035
PATH-MODIFYING APPARATUS FOR CONTINUOUSLY MOVING WEB
Filed Aug. 2, 1968
2 Sheets-Sheet 1
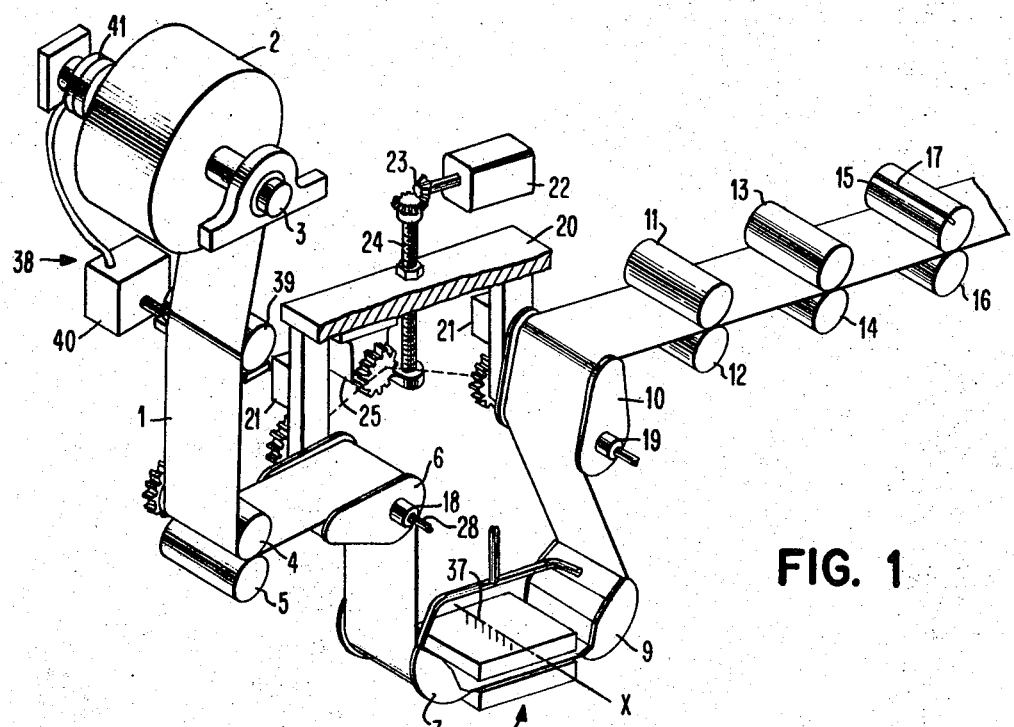
FIG. 1
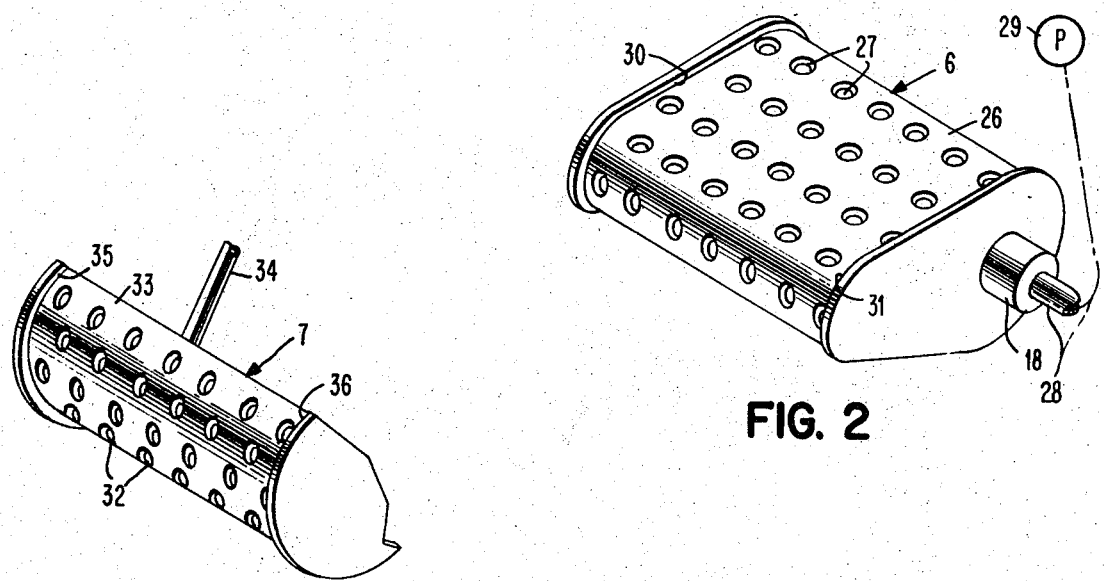
FIG. 3
FIG. 2
INVENTORS
KENNETH B. MAYNARD
ROBERT C. MILLER
BY Henry E Otto
ATTORNEY United States Patent Office 3,531,035
Patented Sept. 29, 1970

3,531,035
PATH-MODIFYING APPARATUS FOR CONTINUOUSLY MOVING WEB
Kenneth B. Maynard, Belle Mead, and Robert C. Miller, Englishtown, N.J., assignors to International Business Machines Corporation, Armonk, N.Y., a corporation of New York
Filed Aug. 2, 1968, Ser. No. 749,713
Int. Cl. B65h 17/42
U.S. Cl. 226—114         5 Claims

ABSTRACT OF THE DISCLOSURE

As a web is fed continuously at a substantially constant speed between two points, its path is modified by this apparatus without adverse inertia effects to intermittently reduce the speed of the web relative to a work station between said points so that a work operation may be performed as if the web were stationary. The web is entrained over a pair of rotating cams disposed at opposite ends of the work station and so configured that as one tends to elongate the web path the other correspondingly shortens it, thereby maintaining the total path length between said points constant. Friction is minimized by providing air-bearing supports at the cams and along any guide surfaces between said points.

BACKGROUND OF INVENTION

Apparatus has heretofore been proposed for changing the path of a continuously moving web to cause the web to be intermittently stopped or slowed at a work station. However, isofar as is known, such apparatus employs structure which is of significant mass and is periodically reversed, thus creating considerable inertia effects during acceleration and deceleration of the mass. For example, the apparatus disclosed in U.S. Pat. 2,971,684 employs a pair of rollers which are reciprocated along the web path; and U.S. Pat. 3,102,673 discloses an apparatus that employs a pair of rollers which are oscillated by being pivotally mounted at opposite ends of a centrally supported oscillating arm. These and other known arrangements thus undesirably subject the web intermittently to longitudinal tensile or stretching forces; and they are not suitable for use in high-speed mechanisms because of the time required to effect reversal of the direction of the reciprocating or oscillating structure.

SUMMARY OF INVENTION

The principal object of this invention is to provide an apparatus wherein the path of travel of a web that is being fed continuously at substantially constant speed between two points may be changed by means which create no inertia effects and are capable of stopping or substantially slowing a fast-moving web periodically at a work station to enable a work operation to be performed intermittently thereon.

Toward this end, and according to the invention, the apparatus embodies a pair of cams over which the web is entrained and which form part of the web path. These cams are adjacent opposite ends of the work station and configured complementarily such that as one tends to elongate the web path between one of the points and the work station, the other will correspondingly shorten the path, thus maintaining the total path length between said points substantially constant. The cams and any guide means interposed between the input and output points of the web preferably provide an air bearing support for the web to minimize friction and static.

Other objects and advantages will become apparent from the following more detailed description of the invention and from the accompanying drawings, wherein:

FIG. 1 is a schematic perspective view of a substantially inertialess web-path-modifying apparatus embodying the invention;

FIG. 2 is an enlarged perspective view, partially schematic, of a rotatable cam forming part of the apparatus of FIG. 1;

FIG. 3 is an enlarged perspective view of a guide shoe forming part of such apparatus.

DETAILED DESCRIPTION OF INVENTION

Figure 4A:
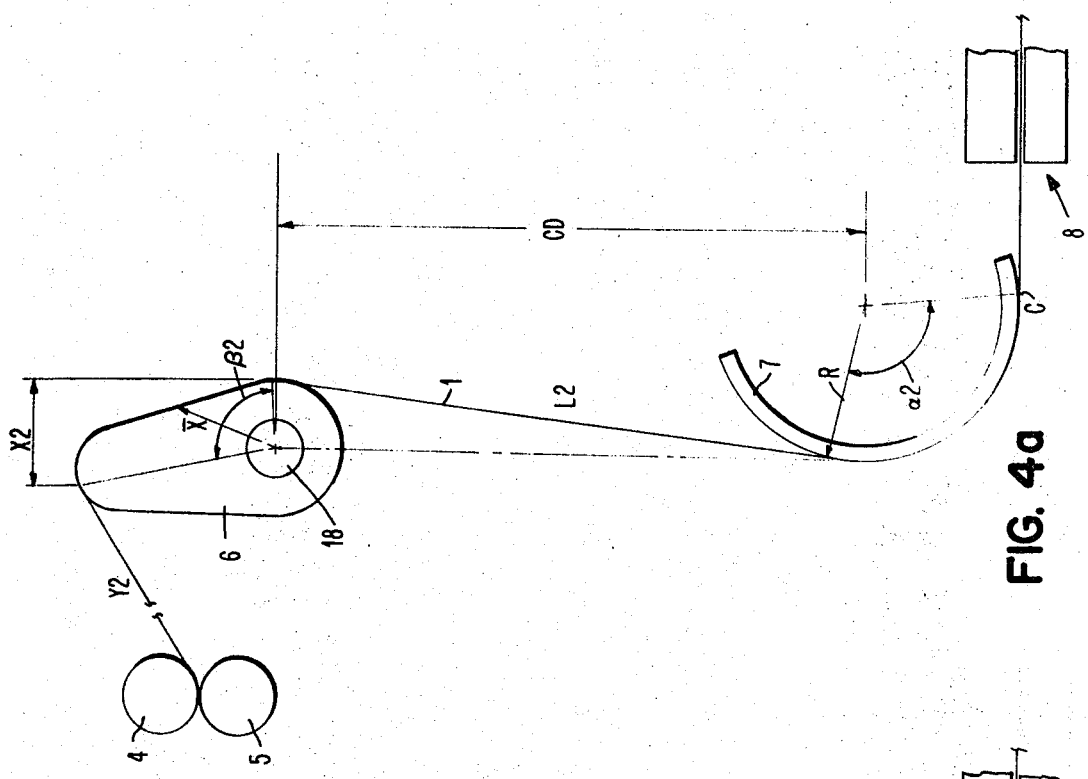
FIGS. 4, 4a are enlarged diagrammatic views, illustrating the kinetic principle involved in this path-modifying apparatus.

As illustrated in FIG. 1, the web-path-modifying apparatus embodying the invention comprises a web 1 of paper or card stock which is unreeled from a supply reel 2 that is rotatably mounted on a suitably supported shaft 3. The web is advanced by a conventional driven come-along roll 4 through the nip of said roll and an idler roll 5, and thence over a cam 6 and around a curved guide member 7 past a work station, designated generally 8; thence the web continues around a curved guide member 9 and over a cam 10 into the nip of a conventional suitably driven pair of feed rolls 11, 12. Thereafter, in the embodiment illustrated, the web is advanced between the nip of a print cylinder 13 and back-up roll 14, and thence through the nip of a cut-off roll 15 and back-up roll 16, so as to be cut to a preselected desired length by a cutter blade 17 inset in the periphery of roll 15.

According to the invention, the length of the web path between two predetermined points (the nips of rolls 4, 5 and 11, 12, respectively) is maintained constant by mechanism including the cams 6, 10; however, cam 6 successively elongates and then contracts the input portion of the web path defined between the nip of rolls 4, 5 and the center line X of work station 8, while cam 10 simultaneously is successively contracting and then elongating the output portion of the web path defined between said center line X and the nip of rolls 11, 12. Cams 6, 10 are rotatably mounted on respective shafts 18, 19. Both ends of the respective shafts 18, 19 are journaled within bearings (not shown) in a support platform 20 (only partially shown) having slidably guided vertical movement as constrained by vertical guide tracks 21. A reversible intermittently operable motor 22 acts through a bevel gear 23 and a rotatable screw 24 that is constrained against axial movement, to raise and lower platform 20 and thus adjust the distances of the axis of shafts 18, 19 from center line X, for reasons hereinafter explained. Operation of motor 22 may be controlled manually; or, if desired, could be controlled automatically, such as from a punched-tape input or computer.

The shafts 18, 19 are suitably driven at the same angular velocity, which angular velocity is correlated to the constant speed at which the web is continuously driven by feed rolls 11, 12. These shafts may, for example, be driven through appropriate gearing (not shown), from a motor 25 that preferably depends from platform 20 so that the angular velocity of cams 6, 10 can be maintained constant despite variation in the vertical positioning of the cams.

Cams 6, 10 are complementarily configured, such that one will elongate the input portion of the web path to the same extent that the other decreases it, and conversely. The term "complementarily configured," as used herein, is intended broadly to cover cams of different configurations or the cams 6, 10 actually illustrated which are identically configured but out of phase with each other by an appropriate angular relationship. For example, the two-lobed cam 6, as illustrated in FIG. 1, is 90° out of phase with the identically shaped two-lobed cam 10; whereas if single-lobed cams were employed, they would be 180° out of phase. In any event, each cam (e.g., see cam 6 in FIG. 2) has a permeable cam surface 26 which, as illustrated, is provided by a plurality of suitably spaced ports 27; and shaft 18 is hollow and connected via suitable tubing 28 to a source 29 of pneumatic fluid under pressure so that air supplied from the source via the ports will provide an air bearing cushion for the web to minimize static and/or friction. Spaced parallel shoulders 30, 31 at opposite transverse ends of each cam constrain the web against lateral shifting or drift.

Each stationary guide member (e.g., see member 7 in FIG. 3) likewise has a plurality of spaced ports 32 connecting its curved guide surface 33 with a manifold (not shown) that is chargeable with pneumatic pressure fluid from the source 29 via tubing 34. This pressure fluid provides an air cushion tending to hold the web out of sliding contact with surface 33, again for the purpose of minimizing static and/or friction. Spaced parallel shoulders 35, 36 at opposite transverse ends of each guide member constrain the web against lateral shifting or drift as it advances past the work station.

The work station 8 may, for sake of illustration, be comprised of a single bank of punches 37 (shown schematically) disposed along the transverse center line X and selectively actuatable in conventional manner by suitable means (not shown). However, if preferred, other types of work operations may be performed at the work station; e.g., the web may be printed upon, photographed, optically scanned, or punched simultaneously in a plurality of columns and rows by a suitably controlled gang punch mechanism. In each case it will be apparent that the work operation can be performed in-line on a continuously moving web with mechanism that is conventionally mounted for operation at a fixed work site.

The apparatus preferably also comprises a conventional web-tensioning control mechanism, designated generally 38, for maintaining web tension at a substantially constant preselected value as the web is advanced along the path between the predetermined points defined by the nips of rolls 4, 5 and 11, 12 respectively. This mechanism may comprise a strain gage (not shown) that is mounted on the bearing of a tension-indicating roll 39 to measure roll deflection. A control mechanism 40 translates this indicia of actual web tension into a control signal that is compared in a Wheatstone bridge-type circuit with the signal corresponding to the preselected desired web tension so as to control application and release of a disk brake 41 as necessary to maintain web tension substantially constant at said preselected value.

Figure 4:
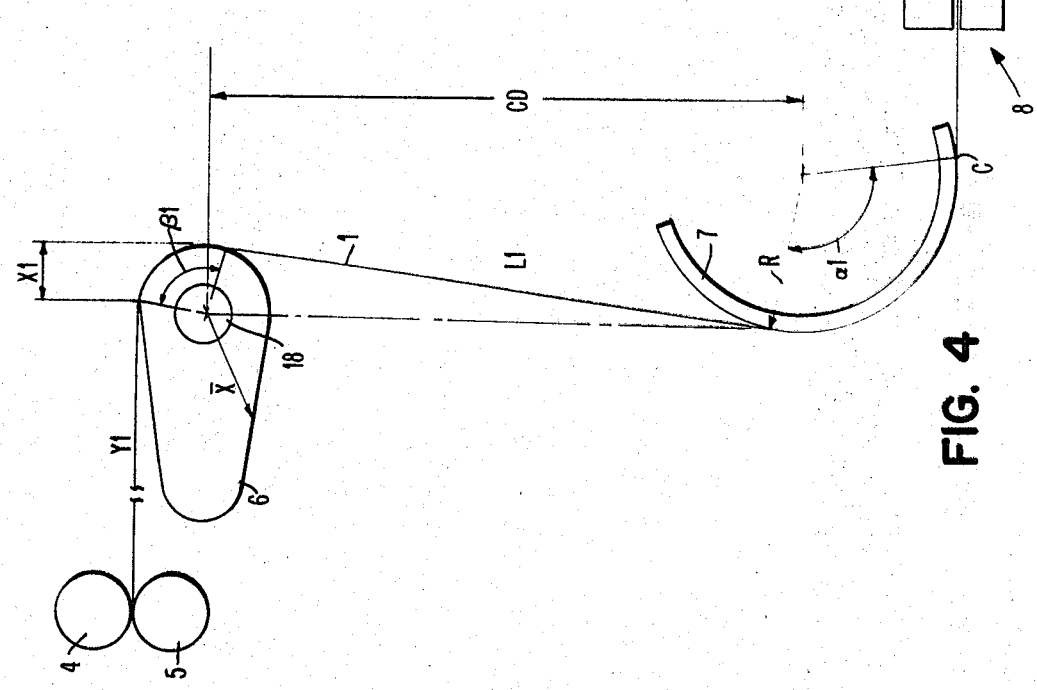

Referring now to FIG. 4, if the initial length $WL_1$ of the web between the nip of rolls 4, 5 and tangent point C of guide member 7 is denoted as:

$$WL_1 = \overline{X}\beta_1 + R\alpha_1 + L_1 + Y_1$$

where:

$$L_1 = (X_1^2 + CD^2)^{\frac{1}{2}}$$

Then, after a 90° revolution of the cam, the length $WL_2$ as shown in FIG. 4a becomes:

$$WL_2 = \overline{X}\beta_2 + R\alpha_2 + L_2 + Y_2$$

where:

$$L_2 = (X_2^2 + CD^2)^{\frac{1}{2}}$$

The change in web length during this portion of the cycle thus is:

$$\Delta WL = WL_1 - WL_2 = \overline{X}(\beta_1 - \beta_2) + R(\alpha_1 - \alpha_2) + [X_1^2 + CD^2]^{\frac{1}{2}} - [X_2^2 + CD]^{2\frac{1}{2}} + [Y_1 - Y_2]$$

From the last equation, it will be apparent that the incremental change in web path length is directly related to the distance from the axis of the cam to the center line X of the work station; and any change in the axial position of the cam will change the distance the web travels per revolution of each cam. Thus, the greater the "throw" of the cams 6, 10, the greater the extent and percentage of modification in web path length per cam revolution, and hence the greater the distance the web will travel between successive work operations (e.g., punch strokes) for a given web speed. For a given cam configuration, raising platform 20 and hence increasing the distance from the axis of the cams 6, 10 to the center line X of the work station will reduce the percentage of change or modification in web path length per cycle. Hence, for a given punching cycle frequency, the spacing in the direction of web travel between successive punches, scores, cuts or other operations may be precisely adjusted by selecting an appropriate configuration for cams 6 and 10 and then making the final vernier adjustment by precise positioning of platform 20.

It now will be apparent that this simple and relatively inexpensive apparatus may be employed to perform a wide variety of work operations in-line on a web as it is advanced continuously at constant speed. Since the web is in effect stationary at the instant the work operation is to be performed, the devices for performing the work may be of conventional types not requiring special adaptation for "on-the-fly" operation. Since the cams 6, 10 rotate at constant angular velocity, there will be no back lash such as occurs with the arrangements heretofore proposed, in which the web-path-modifying apparatus intermittently reverses direction.

Moreover, in the apparatus herein disclosed, the only inertia forces involved are those in the web itself; and the intermittent stopping or reduction in web velocity relative to the work station is accomplished by use of directly driven cams 6, 10 that preferably provide air bearing support to minimize static and/or friction. By appropriate control of motor 22 between successive work operations, the spacing in the web feed direction between successive punches or the like may actually be varied between work operations and while the web is moving.

It will be apparent that the foregoing and other changes may be made without departing from the spirit, scope and teaching of the present invention. Accordingly, the apparatus herein disclosed is to be considered merely as illustrative, and the scope of the invention is to be limited only as specified in the claims.

What is claimed is:

1. In an apparatus for changing the path of travel of a web as it is fed continuously at substantially constant speed between two points but at intermittently varying speed relative to a work station disposed along such path and between said points, a pair of rotating cams over which the web is entrained and forming part of the web path, said cams being configured such that as one tends to elongate the web path between one of the points and the work station, the other will correspondingly shorten the path, and conversely, substantially without changing inertia forces on the web, thereby to cause the total path length between said points to remain substantially constant and inertia forces to be limited to those of the web itself, means for supplying fluid under pressure to the exterior of said cams to provide a fluid cushion between the respective cam surface and web, and means associated with each cam to prevent lateral drift of the web as it moves over such cam.

2. In an apparatus according to claim 1, a guide member intermediate each cam and the work station, each guide member and cam having sets of spaced shoulders between which the web is guided, and means for supplying air under pressure to the exterior of each guide member and cam to provide an air bearing support for the web to minimize wear and static.

3. Apparatus for intermittently varying the speed of a web past a work station by changing the path of travel of the web, said apparatus comprising:

means for advancing the web at a substantially constant speed between two predetermined points adjacent opposite ends of the work station, a pair of cam elements over which the web is entrained and each disposed between one of said points and the work station, and means for rotating the cam elements at the same angular velocity and at a speed correlated to the web speed, said cam elements being configured complementarily such that as one tends to elongate the web path between one of the points and the work station, the other will correpondingly shorten the path, and conversely, thereby to provide at least one period during every revolution of the cam elements when the web speed is reduced to a predetermined low value to permit a work operation to be performed thereon at the work station while maintaining the total web path length between said points substantially constant, and means for simultaneously and to equal degrees adjusting the amount of maximum wrap of the web around the cam elements thereby to adjust the amount of incremental advance of the web between successive periods at which web speed is reduced to said predetermined low value.

4. Apparatus according to claim 3, wherein said means for adjusting comprises means for concurrently and to equal degrees adjusting the distances between the axes of rotation of both of said cam elements and the transverse center line of the work station.

5. Apparatus for intermittently varying the speed of a web past a work station by changing the path of travel of the web, said apparatus comprising:

means for advancing the web at a substantially constant speed between two predetermined points adjacent opposite ends of the work station, a pair of cam elements over which the web is entrained and each disposed between one of said points and the work station, and means for rotating the cam elements at the same angular velocity and at a speed correlated to the web speed, said cam elements being configured complementarily such that as one tends to elongate the web path between one of the points and the work station, the other will correpondingly shorten the path, and conversely, thereby to provide at least one period during every revolution of the cam elements when the web speed is reduced to a predetermined low value to permit a work operation to be performed thereon at the work station while maintaining the total web path length between said points substantially constant, each cam element comprising:

transversely spaced shoulders to prevent lateral shifting of the web, and a permeable surface through which air under pressure may be supplied outwardly from the interior of the cam element to provide an air bearing support for the web.

References Cited
UNITED STATES PATENTS

| | | | |
|---|---|---|---|
| 2,762,255 | 9/1956 | Anderson | 226—114 X |
| 3,085,457 | 4/1963 | Fischer | 226—114 X |
| 3,216,638 | 11/1965 | Brickle | 226—97 |
| 3,460,729 | 8/1969 | Treff | 226—44 X |

RICHARD A. SCHACHER, Primary Examiner